No. 677,100. L. F. OPPOLD. Patented June 25, 1901.
COAL SCUTTLE.
(Application filed Dec. 24, 1900.)

(No Model.)

Witnesses:
R. J. Jacker
P. L. Weaver

Inventor:
Louis F. Oppold,
By Walter N. Haskell.
Atty.

UNITED STATES PATENT OFFICE.

LOUIS F. OPPOLD, OF STERLING, ILLINOIS.

COAL-SCUTTLE.

SPECIFICATION forming part of Letters Patent No. 677,100, dated June 25, 1901.

Application filed December 24, 1900. Serial No. 40,845. (No model.)

*To all whom it may concern:*

Be it known that I, LOUIS F. OPPOLD, a citizen of the United States, residing at Sterling, in the county of Whiteside and State of Illinois, have invented certain new and useful Improvements in Coal-Scuttles; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to coal-scuttles, and pertains more especially to the construction of a swinging hood therefor. I am aware that movable hoods of this character have been heretofore known; but they have been somewhat complicated and expensive to make.

My device is simple and can be cheaply manufactured, requiring no more material than an ordinary hood secured to the pail. It is so constructed as to form a lap at each edge on the inside of the coal-scuttle, preventing the sifting of the coal-dust therethrough. Another advantage lies in the fact that the shape of the hood conforms to the shape of the rear part of the scuttle, permitting the packing of the same therein for transportation or storage, resulting in a considerable economy of space.

Figure 1:
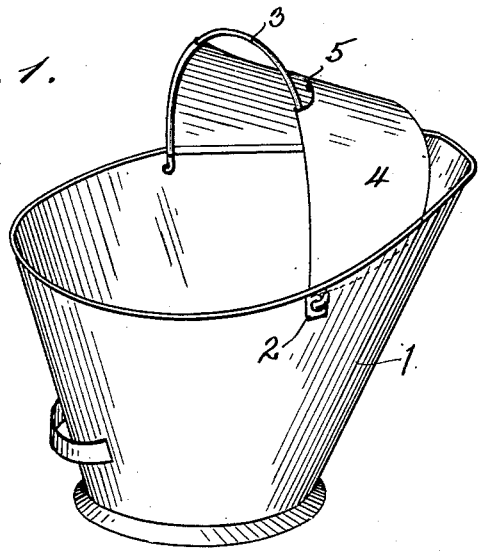
Figure 2:
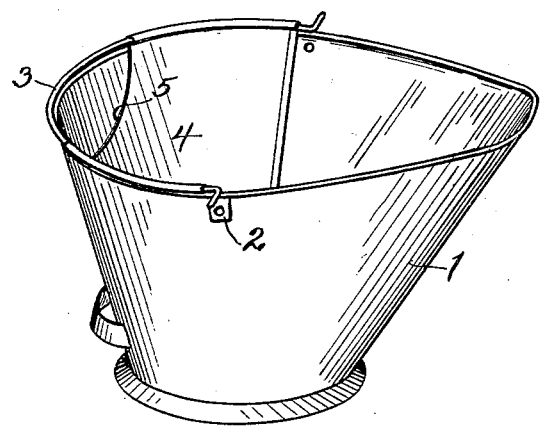

In the drawings, Figure 1 is a view of my device in perspective. Fig. 2 is a similar view with the hood detached and packed in the coal-scuttle.

1 is an ordinary coal-scuttle provided with perforated ears 2 and a bail 3, to the sides of which bail is secured the rear edge of the hood 4, such hood being provided at its top with an opening 5 to permit of the use of the bail, as in ordinary coal-pails. The free lower edges of the hood 4 pass inside of the coal-pail and rest upon the flanging sides thereof.

To prevent the lower edges becoming bent by use, they may be reinforced by turning such edges inward against the face of the hood or by turning them upon a wire of suitable strength, forming a rim on each lower edge of the hood. The front edge or arch of the hood may be constructed in a similar manner to prevent spreading thereof and strengthen the sides of the hood.

In Fig. 2 the hood is detached and packed in the pail, whereby the pail takes up only the room required for itself. In this condition several pails can be packed one in the other and considerable space saved in shipping or storage.

To secure the hood in place, the ends of the bail 3 are passed through the ears 2 and turned inward, holding the bail pivotally in place.

The operation of devices of this kind is too well understood to require any further explanation of my invention.

What I claim as my invention, and desire to secure by Letters Patent of the United States, is—

In a device of the character described, a scuttle, a bail therefor having a hook at each end, a hood secured to the bail from hook to hook with the exception of its central portion which is cut away to form a handhold, said hood having a configuration to closely fit within the back of the scuttle with the bail resting on the top thereof and adapted to be secured to the scuttle by engaging the hooks in ears of the scuttle, in which position the side edges of the hood slidably fit within the spout of the scuttle, substantially as described.

In testimony whereof I affix my signature in presence of two witnesses.

LOUIS F. OPPOLD.

Witnesses:
BERT JOHNSON,
G. W. MEHAFFEY.